(12) United States Patent
Tanaka et al.

(10) Patent No.: US 7,396,794 B2
(45) Date of Patent: Jul. 8, 2008

(54) GAS DIFFUSIVE ELECTRODE BODY AND METHOD OF MANUFACTURING THE SAME AS WELL AS ELECTROCHEMICAL DEVICE

(75) Inventors: Koichi Tanaka, Kanagawa (JP); Kenji Katori, Kanagawa (JP); Minehisa Imazato, Tokyo (JP); Kiyoshi Yamaura, Kanagawa (JP); Katsuya Shirai, Kanagawa (JP); Junji Kuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 702 days.

(21) Appl. No.: 10/467,446

(22) PCT Filed: Feb. 21, 2002

(86) PCT No.: PCT/JP02/01567

§ 371 (c)(1),
(2), (4) Date: Aug. 6, 2003

(87) PCT Pub. No.: WO02/067349

PCT Pub. Date: Aug. 29, 2002

(65) Prior Publication Data

US 2004/0067409 A1 Apr. 8, 2004

(30) Foreign Application Priority Data

Feb. 21, 2001 (JP) .............................. 2001-044442

(51) Int. Cl.
*H01M 4/88* (2006.01)
(52) U.S. Cl. ...................................... 502/101
(58) Field of Classification Search .................. 502/101
See application file for complete search history.

(56) References Cited

U.S. PATENT DOCUMENTS

| 3,282,738 | A | * | 11/1966 | Langer et al. | ................ | 502/101 |
| 3,527,616 | A | * | 9/1970 | Landi | ........................ | 429/42 |
| 4,031,033 | A | * | 6/1977 | Budevski et al. | ............ | 252/511 |
| 4,407,907 | A | * | 10/1983 | Takamura et al. | ............. | 429/42 |
| 4,446,210 | A | * | 5/1984 | Okada et al. | .................. | 429/42 |
| 4,551,220 | A | * | 11/1985 | Oda et al. | ................... | 204/294 |
| 4,894,355 | A | * | 1/1990 | Takeuchi et al. | ............ | 502/101 |

(Continued)

FOREIGN PATENT DOCUMENTS

EP 0 397 623 11/1990

(Continued)

OTHER PUBLICATIONS

Chiang et al., *Efficient Synthesis of Polyhydroxylated Fullerene Derivatives via Hydrolysis of Polycyclosulfated Precursors*, J. Org. Chem., 1994, 59, 3960.

(Continued)

*Primary Examiner*—J. A. Lorengo
*Assistant Examiner*—Patricia L Hailey
(74) *Attorney, Agent, or Firm*—Bell, Boyd & Lloyd LLP

(57) ABSTRACT

A gas diffusive electrode, an electrochemical device employing same, and methods of manufacturing and using same are provided. The gas diffusive electrode includes platinum powder and carbon powder or grain, to which carbon powder or grain whose particles are provided with a water-repellent film is further mixed. The gas diffusive electrode maintains an enhanced gas permeability.

9 Claims, 8 Drawing Sheets

U.S. PATENT DOCUMENTS

2004/0076870 A1 * 4/2004 Tanaka et al. ............... 429/40

FOREIGN PATENT DOCUMENTS

| | | | |
|---|---|---|---|
| JP | 63-043259 | * | 2/1988 |
| JP | 2-298523 | | 12/1990 |
| JP | 5-36418 | | 2/1993 |
| JP | 5-234599 | | 9/1993 |
| JP | 5-283084 | | 10/1993 |
| JP | 7-22035 | | 1/1995 |
| JP | 07-022035 | * | 1/1995 |
| JP | 8-264190 | | 10/1996 |
| JP | 08-264190 | * | 10/1996 |
| JP | 09-041181 | * | 2/1997 |
| JP | 11-510311 | | 9/1999 |
| JP | 2000-239704 | | 9/2000 |
| WO | WO 97/21256 | | 6/1997 |
| WO | WO 01/06519 | | 1/2001 |

OTHER PUBLICATIONS

Chiang et al., *Multi-hydroxy Additions onto $C_{60}$ Fullerene Molecules*, J. Chem. Soc., 1992, pp. 1791-1793.

* cited by examiner

GAS DIFFUSIVE ELECTRODE BODY AND METHOD OF MANUFACTURING THE SAME AS WELL AS ELECTROCHEMICAL DEVICE

CROSS REFERENCE TO RELATED APPLICATIONS

This patent application claims priority to Japanese Patent Document No. P2001-044442 filed on Feb. 21, 2001, the disclosure of which is herein incorporated by reference.

BACKGROUND OF THE INVENTION

The present invention relates to a gas diffusive electrode that can suitably be used for producing a fuel cell and a method of producing such an electrode. The present invention also relates to an electrochemical device.

The need for clean energy sources that can replace fossil fuel including petroleum has been strongly recognized in recent years. Particularly, hydrogen (gas) fuel has been attracting attention.

Hydrogen can operate as an ideal energy source that is clean and inexhaustible because it provides a large amount of chemical energy per unit mass and does not produce harmful substances nor gas that can warm the earth when it is burnt.

Recently, fuel cells adapted to turn hydrogen energy into electric energy have been developed vigorously. Expected applications of such fuel cells include large scale power generation plants, on-site non-utility power generation facilities and power sources of electric automobiles.

Such a fuel cell is typically designed to provide electromotive force by arranging a hydrogen electrode and an oxygen electrode with a film of a proton conducting body sandwiched between them and causing a cell reaction to take place by supplying fuel (hydrogen) and oxygen to the respective electrodes. The cell is normally produced by molding a film of proton conducting body, a fuel electrode (e.g., hydrogen electrode) and an oxygen electrode separately and then putting and binding them together.

Both the fuel electrode (e.g., hydrogen electrode) and the oxygen electrode (gas diffusive electrode) are mainly made of electro-conductive carbon grain and additionally comprise a catalyst layer carrying a catalyst metal such as platinum.

Conventionally, such a gas diffusive electrode is realized in the form of a sheet that is prepared by using electro-conductive powder or grain of carbon and catalyst grain carrying platinum as catalyst along with water-repellent resin such as fluorine resin and an ion conducting material or by directly applying catalyst grain, water-repellent resin and an ion conducting material onto a carbon sheet.

More specifically, a gas diffusive electrode of a solid polymer fuel cell is produced typically by applying particles carrying platinum onto a carbon sheet along with water-repellent resin and an ion conducting material in a manner as disclosed in Japanese Patent Application Laid-Open Publication No. 5-36418.

A gas diffusive electrode as used herein refers to an electrode having continuous pores that can diffuse working gas and showing electron conductivity.

When such a gas diffusive electrode is used as the hydrogen decomposing electrode of a fuel cell such as a solid polymer type fuel cell, the supplied fuel is ionized by the catalyst such as platinum and electrons generated as a result of ionization flow through the electro-conductive carbon powder or grain, while protons ($H^+$) generated as a result of ionization of hydrogen flow to the film of an ion (proton) conducting body by way of the ion conducting material. It will be appreciated that, for the above process, gaps for allowing gas to flow, electro-conductive grain or powder of carbon, an ion conducting material for allowing ions to flow and a catalyst for ionizing fuel and an oxidizing agent need to be provided.

Thus, fuel is ionized by the catalyst such as platinum and electrons generated as a result of ionization are made to flow through the electro-conductive grain or powder of carbon while the ionized hydrogen (protons) are made to flow to the ion conductive film by way of the ion conducting material. For the above process, gaps for allowing gas to flow, electro-conductive grain or powder of carbon, an ion conducting material for allowing ions to flow and a catalyst for ionizing fuel and an oxidizing agent need to be provided.

If the fuel is hydrogen, a reaction of

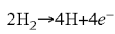
$$2H_2 \rightarrow 4H^+ + 4e^-$$

takes place in the gas diffusive electrode (catalyst layer) of the fuel cell, whereas a reaction of

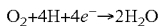
$$O_2 + 4H^+ + 4e^- \rightarrow 2H_2O$$

takes place in the oxygen electrode of the cell to produce water.

Meanwhile, in a fuel cell of the type under consideration, it is very important how to make the two reactions proceed smoothly in the respective electrodes for the purpose of improving the performance of the cell.

Particularly, the above described oxygen electrode is accompanied by problems including that the electrode reaction takes place only insufficiently to reduce the output level of the fuel cell because water ($H_2O$) produced in the course of the reaction in the electrode adheres to the peripheries of the particles of the carbon powder or grain within the catalyst layer (gas diffusion layer) and reduces the gaps.

SUMMARY OF THE INVENTION

The present invention provides a gas diffusive electrode that can maintain an excellent gas permeability and provide a high output level, a method of producing such an electrode and an electrochemical device employing such an electrode.

In an embodiment of the present invention, the present invention provides a gas diffusive electrode that includes a catalyst, a first electrical conductive powder or grain, and a second electro-conductive powder or grain having a water-repellent film.

In another embodiment of the present invention, is the present invention provides a method of producing a gas diffusive electrode by mixing a catalyst, a first electrical conductive powder or grain a second electro-conductive powder or grain having a water-repellent film and drying the mixture.

In still another embodiment of the present invention, is the present invention provides an electrochemical device including a first electrode, a second electrode and an ion conductor between the first electrode and the second electrode, at least one of the electrodes is a gas diffusive electrode made of a catalyst, a first electrical conductive powder or grain, and a second electro-conductive powder or grain having a water-repellent film.

Since a gas diffusive electrode according to an embodiment of the present invention is formed by using a catalyst and an electro-conductive powder or grain including a second electro-conductive powder or grain having a water-repellent film, the water produced in the gas diffusive electrode is effectively repelled by the water-repellent film of the second electro-conductive powder or grain so that the water is discharged without adhering to the electro-conductive powder or grain and the permeation of gas is not hindered by the produced water. Thus, the gas diffusive electrode can satisfactorily maintain its gas permeability into the inside thereof.

Since a gas diffusive electrode according to an embodiment of the invention is formed by mixing a second electro-conductive powder or grain having a water-repellent film with other ingredients and drying the mixture, it can be produced in a relatively simple way without requiring any complex producing process.

Additional features and advantages of the present invention are described in, and will be apparent from, the following Detailed Description of the Invention and the figures.

DETAILED DESCRIPTION OF THE INVENTION

The present invention generally relates to gas diffusive electrodes that can be employed in an electrochemical device, such as a fuel cell and methods of producing same.

In an embodiment, the gas diffusive electrode includes a catalyst, a first electrical conductive material, and a second electrical conductive material that includes a film component capable of repelling water. The electrical conductive material, in an embodiment, is in the form of a powder, grain and/or the like.

Preferably, the second electro-conductive powder or grain having a water-repellent film, in an embodiment, agglomerates to form a chain structure and is contained in the mixture by 1 to 80 weight %.

Preferably, the water-repellent film includes a fluoroine-based resin and the first electrical conductive powder or grain and/or second electro-conductive powder or grain includes carbon particles, wherein the catalyst is mixed in the form of powder or grain or in a state allowing coating of the first electrical conductive powder or grain.

Preferably, at least one of the first electrode and/or the second electrode, in an embodiment, includes a gas electrode that can be employed in an electrochemical device, such as a fuel cell. The present invention can provide a sufficient degree of gas permeability so as to maintain an output level satisfactory as a cell.

Now, the present invention will be described in greater detail without limitation by referring to the accompanying drawings that illustrate preferred embodiments of the present invention.

Figure 1:
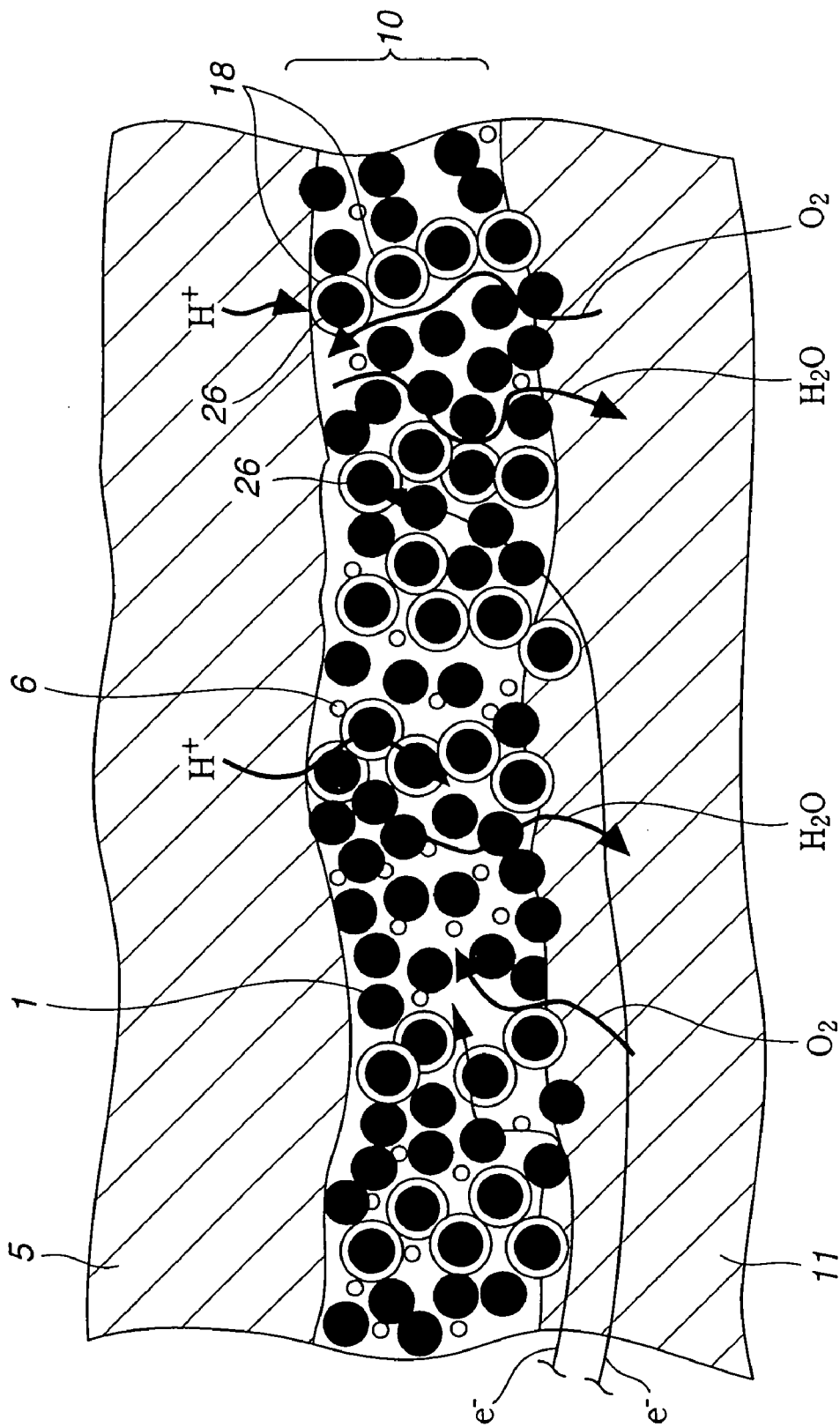
FIG. 1 is a schematic cross sectional view of part of a fuel cell according to an embodiment of the present invention.

Referring to FIG. 1, a gas diffusive electrode 10 according to an embodiment of the present invention is formed as a layer of a mixture of particles of electro-conductive carbon powder or grain 1, particles of electro-conductive carbon powder or grain 26 having a film of water-repellent resin 18 adhering to the surface thereof, and a catalyst 6. It is noted that the gas diffusive electrode 10 is a catalyst layer and the water-repellent resin 18 includes a resin, such as a suitable fluorine-based resin while the catalyst 6 includes platinum, and/or the like.

A gas diffusive electrode according to an embodiment of the present invention is a porous gas diffusive electrode including a catalyst layer 10 and a porous carbon sheet 11 operating as a gas permeating collector body. A film-shaped ion conducting section 5 that is typically made of a pressure-molded body of nafion or a fullerene derivative is sandwiched between the first electrode and the second electrode, at least one of which is formed by using a gas diffusive electrode. In an embodiment, the first electrode includes an oxygen electrode and the second electrode includes a fuel electrode. A proton conductor film is used for the ion conducting section 5.

It should be appreciated that the carbon powder and electro-conductive powder or grain of the gas diffusive electrodes of the present invention contain granules, pellets, filaments and/or pieces of a variety of different and suitable forms.

Figure 4:
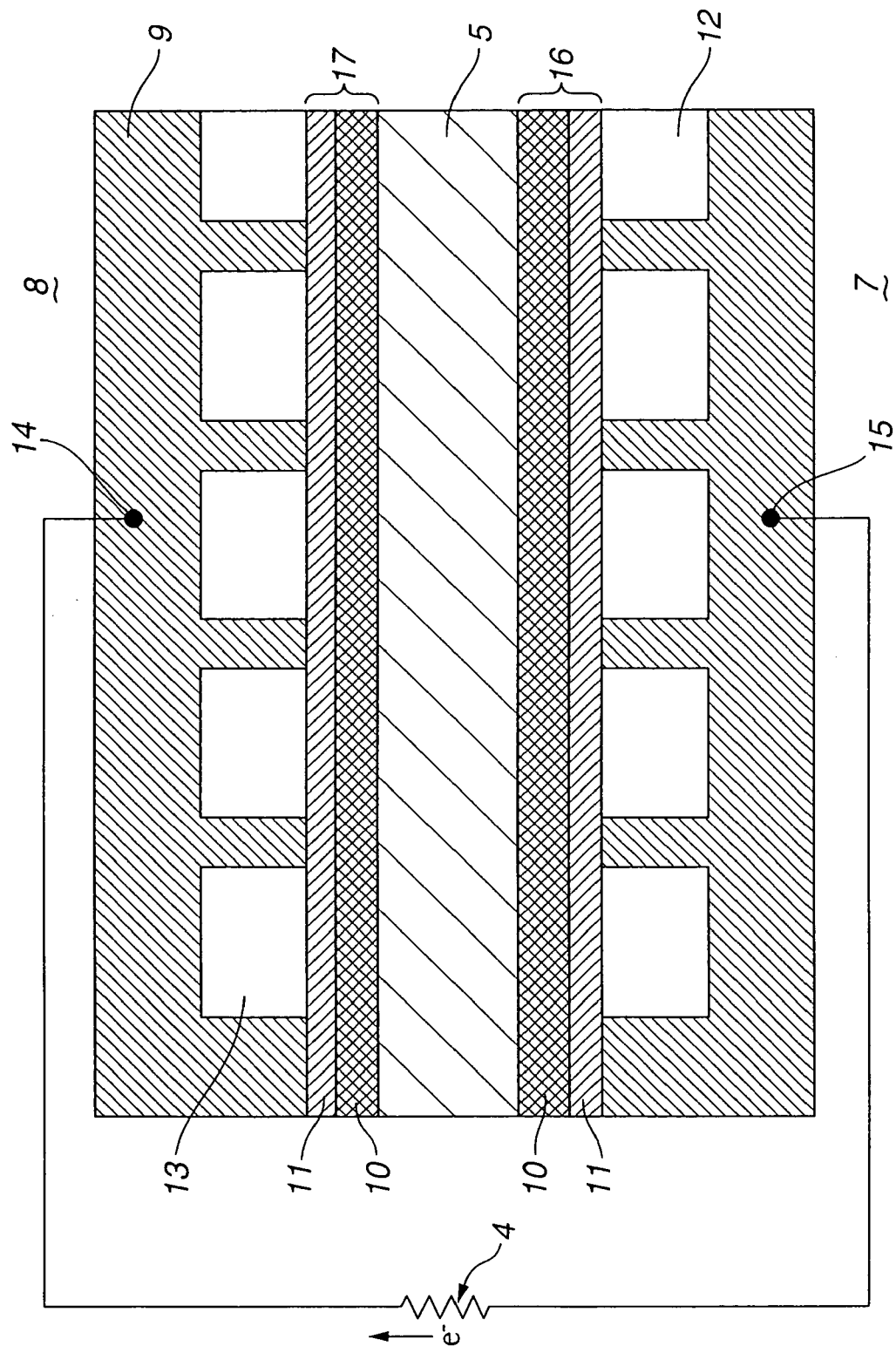
FIG. 4 is a schematic illustration of a fuel cell according to an embodiment of the present invention, showing its configuration.

A fuel cell according to an embodiment of the present invention has a configuration as shown in FIG. 4, which will be briefly described below. In this regard, a fuel cell according to an embodiment of the present invention is formed by arranging a negative electrode 16 and a positive electrode 17 respectively on the opposite sides of an ion conducting section 5 having a proton conductivity. The ion conducting section 5 is made of film of a proton conducting material and the negative electrode 16 operates as fuel electrode, while the positive electrode 17 operates as oxygen electrode.

A cell reaction takes place to generate electromotive force as hydrogen is supplied to the negative electrode 16 operating as fuel electrode and oxygen, or air, is supplied to the positive electrode 17 operating as oxygen electrode. If a direct methanol method is used, it is possible to supply methanol as hydrogen source to the negative electrode 16 operating as fuel electrode.

Figure 3A:
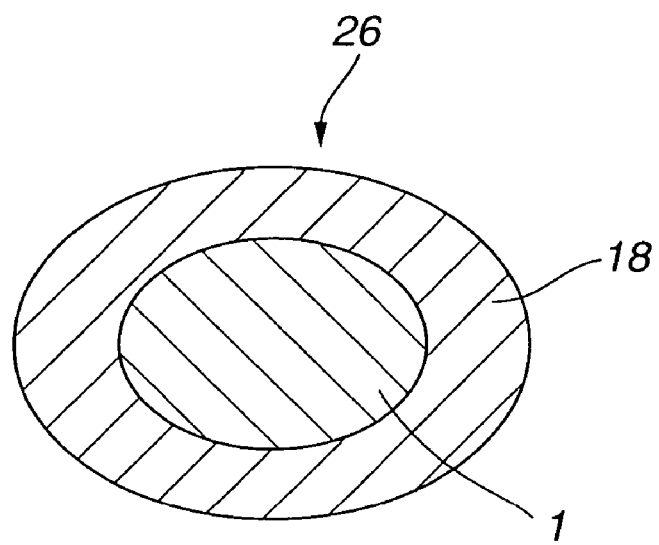
FIGS. 3A and 3B are schematic cross sectional views of electro-conductive carbon powder or grain according to an embodiment of the present invention.
Figure 3B:
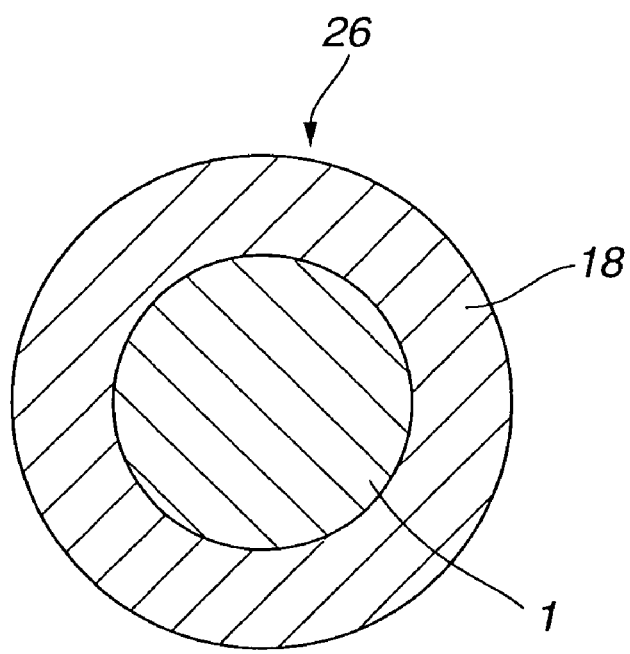

Both the negative electrode (fuel electrode) 16 and the positive electrode (oxygen electrode) 17 of a fuel cell according to an embodiment of the present invention is formed by molding powder or grain 1 of carbon as electrode material. As shown in FIG. 3B, some of the pellet-shaped particles 1 of powder or grain of carbon are coated on the surface thereof with a water-repellent film 18.

Note, however, that the profile of the particles of powder or grain of the carbon material to be used for the purpose of the invention is not limited to that of pellets as illustrated in FIG. 3B. Alternatively, the particles may have a profile as shown in FIG. 3A or some other suitable form so as to be provided with a water-repellent film.

The water-repellent film covering the particles of carbon powder or grain may has a thickness, in an embodiment, of a single molecular layer, which is minimally several nanometers, or more. The upper limit of the thickness of the water-repellent film is preferably several hundred nanometers because the electro-conductivity of the carbon or the grain is reduced if the thickness of the film is too large. The water-repellent film formed on the particles of carbon powder or grain is preferably between about 10 nm and several times of about 10 nm.

For the purpose of the invention, at least some of the particles of carbon powder or grain having a water-repellent film formed thereon may be further coated with a film of a catalyst material, such as platinum and/or the like.

Since water generated as a result of intra-electrode reaction does not adhere to the peripheries of particles 26 of carbon powder or grain having a water-repellent film 18 formed thereon, water generated within the electrodes will not remain there excessively as it is repelled by the film but is discharged from the electrodes to secure gaps through which oxygen gas permeates. Therefore, the supply of oxygen gas into the gas diffusive electrode, or the positive electrode, would not be blocked. As a result, oxygen gas is supplied to the electrode at a sufficient rate and hence the output of the cell can be maintained to a relatively high level.

The surface of particles of carbon powder or grain 1 can be coated with a water-repellent film 18 by dispersing water-repellent resin into a solvent, immersing particles of carbon powder or grain into the solvent and subsequently drying the particles.

Materials that can be used for forming the water-repellent film 18 include fluorine-containing compounds, such as polyvinylidene fluoride (PvdF), fluorine type polymers, such as $C_2F_6$ polymer, and TEFLON (PTFE available from Du Pont). Techniques that can be used forming the water-repellent film 18 include, the dipping method, the plasma CVD method and/or the like.

Since carbon powder or grain that is used as principal material of a gas diffusive electrode according to an embodiment of the present invention is electro-conductive, carbon materials that can be used for the purpose of the present invention include various graphite type carbon materials, carbon nano-tubes and/or the like. From the viewpoint of high gas diffusing effect, the use of needle-shaped particles of graphite is preferable.

Carbon nano-tubes as referred to above can be prepared by arranging a cathode and an anode, both of which are carbon rods typically made of graphite, in a reaction chamber called a vacuum chamber with a gap disposed between them, energizing the electrodes with a DC current to cause an arc discharge to take place there and refining the carbon material deposited on the inner surface of the reaction chamber.

Figure 2A:
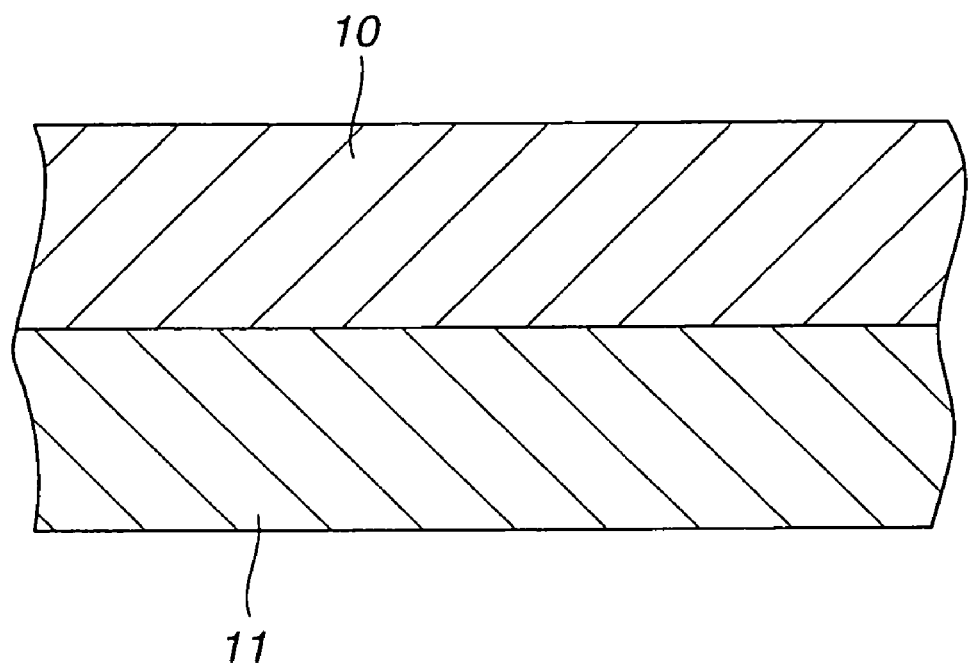
FIGS. 2A and 2B are schematic cross sectional views of a gas diffusive electrode according to an embodiment of the present invention, illustrating different producing steps thereof.
Figure 2B:
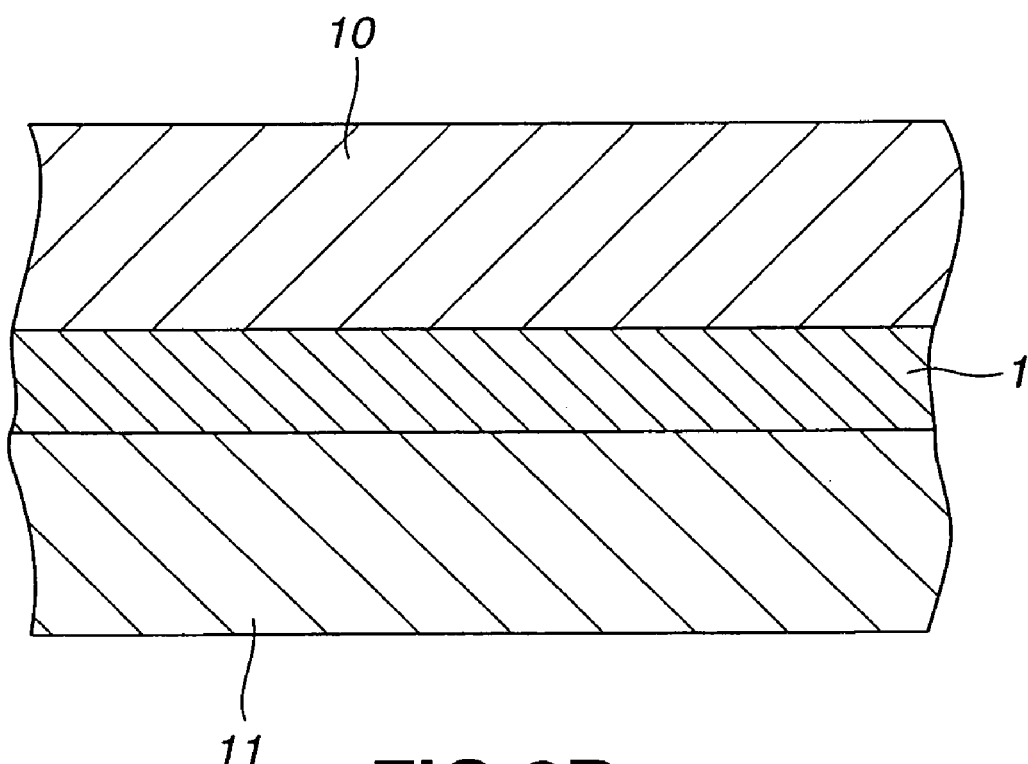

If the carbon material prepared by the above described method is used for a gas diffusive electrode according to the present invention, a negative electrode that operates as a fuel electrode or a positive electrode that operates as an oxygen electrode can be directly formed on a gas permeating collector body 11 as shown in FIG. 2B. Methods that can be used for directly forming a fuel electrode or an oxygen electrode include spin-coating, spraying, dropping, bar coating and/or the like.

With the spin coating method, carbon powder or grain is dispersed into a solvent such as water or ethanol and dropping the carbon-containing solvent directly onto a revolving collector. With the spray method, carbon powder or grain is dispersed into a solvent such as water or ethanol and spraying the carbon-containing solvent directly onto a collector. With the dropping method, carbon powder or grain is dispersed into a solvent such as water or ethanol and dropping the carbon-containing solvent directly onto a collector. With any of the above described electrode forming method, carbon powder or grain is deposited on a collector.

Carbon nano-tubes have a slender and oblong filament-like profile with a diameter of about 1 nm and a length of about 1 to about 10 µm. Pieces of needle-shaped graphite also have a diameter of about 0.1 to about 0.5 µm and a length of about 1 to 50 µm. Therefore, they can become entangled with each other to advantageously form a layer without using any particular binding agent, although a binder may also be used whenever necessary. A resin type binder that is not water-repellent may preferably be used for the purpose of the invention.

Then, a layer of a mixture of carbon powder or grain, carbon powder or grain whose particles are provided with a water-repellent film, said carbon powder or gain and said carbon powder or grain whose particles are provided with a water-repellent film being mixed to a predetermined ratio, and powder of a catalyst metal such as platinum is formed on the above layer to produce a gas diffusive electrode 10 in a manner as shown in FIG. 2B. The gas diffusive electrode 10 operates as catalyst layer.

At this time, a gas diffusive electrode 10 that operates as catalyst layer may be formed directly on the gas permeating collector 11 as shown in FIG. 2A or an under layer may be formed. In an embodiment, the gas permeating collector 11 is formed from a carbon sheet.

A gas diffusive electrode 10 that operates as a catalyst layer can be made to contain a catalyst by mixing a catalyst with carbon powder or grain in a manner as described above. Alternatively, it may be formed by causing a catalyst to the surface of particles of electro-conductive carbon powder or grain by sputtering or by forming a film of a catalyst on the surface of the gas diffusive electrode 10.

For instance, a 1,000 angstrom thick film of a catalyst, such as platinum, can be formed on a substrate by applying a DC of 1 A and 420V to a platinum target having a diameter of about five inches and conducting a sputtering operation for about 8 minutes and 8 seconds, rotating the substrate.

Since carbon powder or grain whose particles are provided with a water-repellent film that is used for a gas diffusive electrode in a manner as described above repels moisture, no moisture will adhere to the peripheries of particles of carbon powder or grain.

Since carbon powder or grain whose particles are provided with a water-repellent film can agglomerate, particles of carbon powder or grain 26 that are provided with a water-repellent film can form continuous chain structure in the gas diffusive electrode 10 that operates as catalyst layer as illustrated in FIG. 1. Therefore, the chain structures of particles of carbon powder or grain 26 that are provided with a water-repellent film form walls that prevent water ($H_2O$) generated in the electrode from penetrating as paths for effectively discharging water are produced there. As a result, the pores (gaps) through which $O_2$ gas and other gas permeate are secured and gas diffuses satisfactorily.

The gas diffusive electrode 10 contains carbon powder or grain whose particles are provided with a water-repellent film by about 1 to about 80 weight %, preferably by about 20 to about 70 weight % to ensure a vigorous cell reaction. If the content by weight % of carbon powder or grain whose particles are provided with a water-repellent film is too small, water generated within the gas diffusive electrode 10 operating as catalyst layer as a result of a cell reaction can adhere to the peripheries of particles of carbon powder or grain to a large extent without being discharged from the electrode and remain within the electrode to fill the gaps through which gas can otherwise pass. Then, gas is prevented from permeating and consequently the cell reaction is weakened. If, on the other hand, the content by weight % of carbon powder or grain whose particles are provided with a water-repellent film is too large, particles of the carbon powder or grain of the electrode cannot contact freely and become distributed unevenly to reduce the electron conductivity and weaken the cell reaction.

As described above, since the negative electrode operating as fuel electrode and the positive electrode operating as oxygen electrode that are equally formed by respective gas diffusive electrodes, each of which is formed directly on a gas diffusing collector typically made of a carbon sheet by spin coating or the like, each of the gas diffusive electrodes do not need to be formed separately as a self-standing film. Thus, it is not required to show a level of mechanical strength capable of withstanding damages that can be produced in operation. Therefore, it can be made to have a very small thickness less than about 10 µm, typically between about 2 and about 4 µm. Alternatively, a self-standing film can be formed.

Preferable materials that can be used for the proton conducting body of a fuel cell according to an embodiment of the present invention include proton (hydrogen ion) conducting polymer materials such as perfluorosulfonic acid resin (e.g., Nafion®, available from Du Pont), various polymolybdenum acids and oxides that are normally hydrates, such as $H_3Mo_{12}PO_{40} \cdot 29\ H_2O$ and $Sb_2O_5 \cdot 5.4\ H_2O$, various carbon materials into which one or more than one proton dissociating groups are introduced, such as fullerene, and mixtures of a compound formed mainly on the basis of silicon oxide or Brønsted acid and a polymer having one or more than one sulfonic groups as side chains, although materials that can be used for the proton conducting body are not limited to those listed above.

Polymer materials such as perfluorosulfonic acid resin and various polymolybdenum acids and oxides that are normally hydrates show a high proton conductivity at room temperature when held in a wet condition. For example, perfluorosulfonic acid resin. Protons produced from the sulfonic acid groups thereof as a result of ionization are bonded to moisture (hydrogen bonds) that is taken into the polymer matrix to a large extent to generate protonated water, or oxonium ions ($H_3O^+$), so that protons can move smoothly in the polymer matrix as oxonium ions. Therefore, such a matrix material shows a considerably high proton conducting effect at room temperature.

A proton conducting materials having a conduction mechanism that is totally different from that of any of the above listed materials may alternatively be used for the purpose of the invention.

Examples of such materials include composite metal oxides having a perovskite structure, such as $SrCeO_3$ doped with Yb (ytterbium). It has been found that composite metal oxides having a perovskite structure show a proton conducting property if moisture is not used as moving medium. It is believed that protons alone are adapted to be channeling through oxygen ions that form the skeleton of the perovskite structure and establish a proton conductivity there.

In the above description of various carbon materials including fullerene, into which proton dissociating groups are introduced, the expression of proton dissociating groups refers to functional groups, such as —OH, —OSO$_3$H, —SO$_3$H, —COOH and —OPO(OH)$_2$, that can release protons as a result of electrolytic dissociation and the expression of dissociation of protons ($H^+$) refers to a phenomenon where protons are released from functional groups as a result of electrolytic dissociation. In proton conducting materials, protons are made to move by way of proton dissociating groups to make the material show an ion conducting property.

Particularly, while any carbon material can be used for the purpose of the present invention so long as it principally contains carbon, it is required to show an ion conductivity greater than its electron conductivity after the introduction of proton dissociating groups.

Specific examples of carbon materials that can be used for the purpose of the present invention include carbon clusters that are agglomerates of carbon atoms and tube-shaped carbon materials containing so-called carbon nano-tubes.

While there are various forms of carbon cluster, fullerene including those having a fullerene structure that partly shows an open end and carbon clusters having a diamond structure may preferably be used for the purpose of the invention.

Now, a carbon cluster will be discussed in greater detail below.

A carbon cluster is an agglomerate normally formed through mutual bonding or agglomeration of several to hundreds of atoms. If the atoms are carbon atoms, the proton conductivity is improved when such agglomerates are formed. Additionally, agglomerates retain their chemical properties and provide a sufficient film strength. Furthermore, they can easily form a layer.

A cluster containing carbon as principal ingredient refers to an agglomerate formed through agglomeration of by several to hundreds carbon atoms regardless of the type of carbon-carbon bond. Note, however, that such a cluster is not necessarily formed 100% by carbon atoms and atoms of other elements may coexist there. Thus, a cluster where carbon atoms constitute the majority of the existing atoms is referred to as carbon cluster.

In a proton conducting body containing a carbon material having proton dissociating groups as principal ingredient, protons can easily be dissociated from proton dissociating groups if it is dried. Additionally, dissociated protons can show a high conductivity over a broad temperature range including room temperature, or a range at least between about −40° C. and about 160° C.

While a proton conducting body shows a sufficiently high proton conductivity if it is dried as pointed out above, water may exist there without problem. Additionally, water may come to exist there from outside.

In the above described embodiment, the mixing ratio and the method of mixing the carbon powder or grain, the carbon powder or grain whose particles are provided with a water-repellent film and the catalyst in the gas diffusive electrode may be modified freely so long as the gas diffusive electrode provides a predetermined effect.

The type of the water-repellent substance, the method for causing the substance to adhere to particles of carbon powder or grain and the thickness of the adhered substance may be modified freely so long as the gas diffusive electrode provides a predetermined effect.

Electro-conductive powder or grain is not necessarily limited to carbon powder or grain. Any other substance may be used in place of carbon if such a substance shows electro-conductive and the gas diffusive electrode prepared by using such a substance provides a predetermined effect.

A gas diffusive electrode according to an embodiment of the present invention includes a layer containing a catalyst metal and the layer containing a catalyst metal contains carbon powder or grain whose particles are provided with a water-repellent film.

When a layer containing a catalyst metal is formed for a gas diffusive electrode according to the invention, carbon powder or grain whose particles are provided with a water-repellent film is formed and mixed thereto.

A fuel cell according to an embodiment of the present invention includes a fuel electrode and an oxygen electrode and the fuel electrode and the oxygen electrode are arranged with a proton conducting film interposed between them. The oxygen electrode has a layer that contains a catalyst metal and the layer containing the catalyst metal also contains carbon powder or grain whose particles are provided with a water-repellent film.

When a layer containing a catalyst metal is formed for a gas diffusive electrode according to the invention, it is formed by mixing carbon powder or grain whose particles are provided with a water-repellent film. Therefore, according to an embodiment of the present invention, it is possible to manufacture with ease a gas diffusive electrode that can secure a sufficient level of gas permeability if water is generated as a result of electrode reaction.

Additionally, the layer containing a catalyst metal of a gas diffusive electrode according to an embodiment of the present invention also contains carbon powder or grain whose particles are provided with a water-repellent film, generated water will not adhere to the peripheries of particles of carbon powder or grain and a sufficient level of gas permeability is secured. Therefore, according to an embodiment of the present invention, a fuel cell can be provided with an output level does not fall for a long period of time.

As discussed above, a gas diffusive electrode is formed by using a catalyst and electro-conductive powder or grain, with which second electro-conductive powder or grain whose particles are provided with a water-repellent film is further mixed. Thus, water generated in the gas diffusive electrode is effectively repelled by the water-repellent film of the particles of the second electro-conductive powder or grain and discharged from the gas diffusive electrode without adhering to the electro-conductive powder or grain. As a result, permeation of gas is not hindered by generated water and a sufficient gas permeability is secured within the gas diffusive electrode.

Furthermore, a gas diffusive electrode according to an embodiment of the present invention can be formed by mixing second electro-conductive powder or grain whose particles are provided with a film with the other materials, it can be produced relatively easily without requiring a complex process.

Figure 5A:
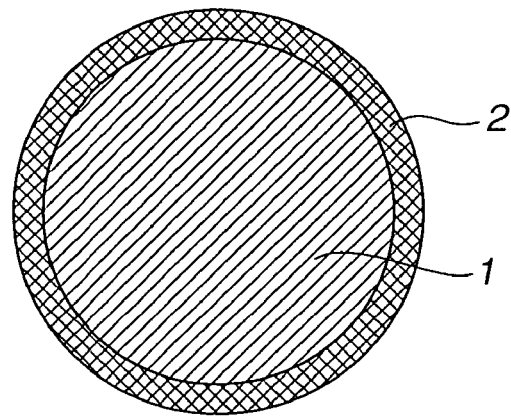
FIGS. 5A, 5B and 5C are schematic cross sectional views of electro-conductive carbon powder or grain according to an embodiment of the present invention.

Electro-conductive carbon powder or grain that can be used according to an embodiment of the invention will be described below. The electro-conductive carbon powder or grain is obtained by using a physical filming forming process as shown in FIG. 5A. Therefore, platinum 2 that operates as catalyst adheres to the surfaces of the particles of the obtained electro-conductive carbon powder or grain. Such electro-conductive powder or gain provides an excellent catalytic effect with a small amount and also a sufficient contact area between the catalyst and gas. In other words, it is possible to obtain a relatively large specific surface area for the catalyst that participates in a reaction and improve the catalysing ability of the catalyst.

Figure 5B:
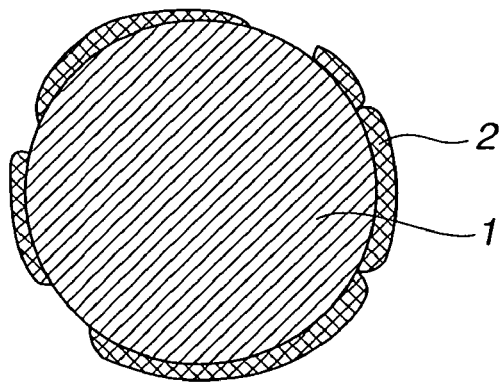

In an embodiment of the present invention, platinum 2 that operates as catalyst may adhere unevenly to the surfaces of the particles of electro-conductive carbon powder or grain as shown in FIG. 5B. Such an arrangement of platinum 2 can provide an excellent catalysing effect with a relatively small amount of catalyst as in the case of electro-conductive carbon power or grain whose grains having a structure as shown in FIG. 5A and also a sufficient contact area between the catalyst and gas. In other words, it is possible to obtain a large specific surface area for the catalyst that participates in a reaction and improve the catalysing ability of the catalyst.

Figure 5C:
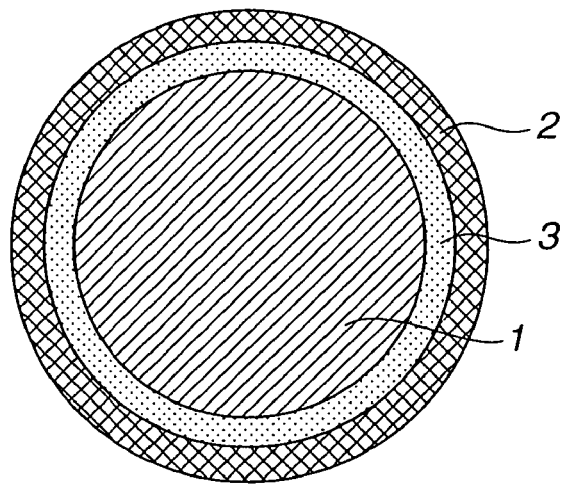

In place of causing platinum 2 that operates as catalyst to adhere to the surfaces of particles of electro-conductive carbon powder or grain and form a film there by means of a physical film forming process, it is also possible to cause an ion conducting substance 3 to adhere to the surfaces of particles of electro-conductive carbon powder or grain and then platinum 2 to further adhere to surfaces of particles carrying the ion conductive substance and form a film there by means of a physical film forming process as shown in FIG. 5C.

Because platinum 2 that operates as catalyst is caused to adhere to the surfaces of particles of electro-conductive carbon powder or grain by means of a physical film forming process, it is no longer necessary to subject the work to a heat treatment process for the purpose of improving the crystallinity of the catalyst unlike conventional methods. Then, it is possible to cause the catalyst to adhere to the surfaces of particles of electro-conductive carbon powder or grain without damaging the ion conducting property of the ion conducting electrode.

With any of the particles of electro-conductive carbon powder or grain illustrated in FIGS. 5A, 5B and 5C, the catalyst is made to adhere to electro-conductive carbon powder or grain preferably at a rate of about 10 to about 1,000 weight % relative to the electro-conductive carbon powder or grain. Preferably, a metal having an electron conductivity is used as catalyst. Examples of such metals include platinum, ruthenium, vanadium, tungsten and/or the like. A mixture of any of such metals can also be used as catalyst for the purpose of the invention. While electro-conductive carbon powder or grain 1 is not subjected to any particular limitations so long as it is acid-resistant, electro-conductive and available at low cost, preferable examples of electro-conductive carbon powder or gain include powdery carbon and ITO (indium-tin oxide), of which powdery carbon is particularly favorable for the purpose of the present invention. The average particle size of carbon powder to be used in an embodiment is preferably about 1 μm or less, more preferably between about 0.005 and about 0.1 μm.

Examples of physical film forming methods that can be preferably used for causing the catalyst to adhere to the surfaces of particles of electro-conductive carbon powder or grain include sputtering, pulse laser deposition (PLD), vacuum evaporation and/or the like.

The use of sputtering as physical film forming process is advantageous because it is easy to use and provides a high productivity and a good film forming effect. The pulse laser deposition method is advantageous for physical film forming processes because the latter can be controlled with ease if the method is used. The film forming effect of the method is also desirable.

PCT Patent Application Laid-Open Publication No. 11-510311 describes a method of forming a film of a noble metal on a carbon sheet by sputtering. For the above described embodiment of the present invention, on the other hand, platinum that operate as catalyst is made to adhere to the surfaces of particles of electro-conductive carbon powder or grain. The method of the present invention is more advantageous than the method described in PCT Patent Application Laid-Open Publication No. 11-510311 because the specific surface area of platinum operating as catalyst can be made greater and the catalysing ability of the catalyst can be improved.

Additionally, in an embodiment of the present invention, when causing platinum that operates as catalyst to adhere to the surfaces of particles of electro-conductive carbon powder or grain to form a film on the surfaces by a physical film forming method, the electro-conductive carbon powder or grain is preferably subjected to vibrations in order to cause a sufficient amount of catalyst to adhere uniformly to each carbon particle. While any appropriate mechanism may be used for applying vibrations to the electro-conductive carbon powder or grain, a preferably mechanism will be such that platinum that operates as catalyst is made to adhere to the surfaces of particles of electro-conductive carbon powder or grain by means of a physical film forming process, while an ultrasonic wave is being applied to generate vibrations in the carbon powder or grain.

According to an embodiment of the present invention, electro-conductive carbon powder or grain obtained by causing platinum that operates as catalyst to adhere to the surfaces of the particles thereof can be bound together typically by means of resin. Additionally, the electro-conductive carbon powder or grain is preferably retained on a porous gas permeating collector such as a carbon sheet.

As described above, a gas diffusive electrode according to an embodiment of the present invention can be substantially made of electro-conductive carbon powder or grain whose particles are provided with a film or it may contain electro-conductive carbon powder or grain and resin for binding the particles of the powder or grain as well as other ingredients. In the latter case, such other ingredients can include, for example, a pore forming agent, such as $CaCO_3$, and ion conductors. Additionally, the electro-conductive carbon powder or grain is preferably retained on a porous gas permeating collector such as a carbon sheet.

Examples of ion conductors that can be used in a gas diffusive electrode and also in the ion conducting section sandwiched between the first and second electrodes of an electrochemical device according to an embodiment of the present invention include Nafion® (perfluorosulfonic acid resin available from Du Pont) as well as fullerene derivatives, such as fullerenol (fullerene-polyhydroxide).

Figure 6B:
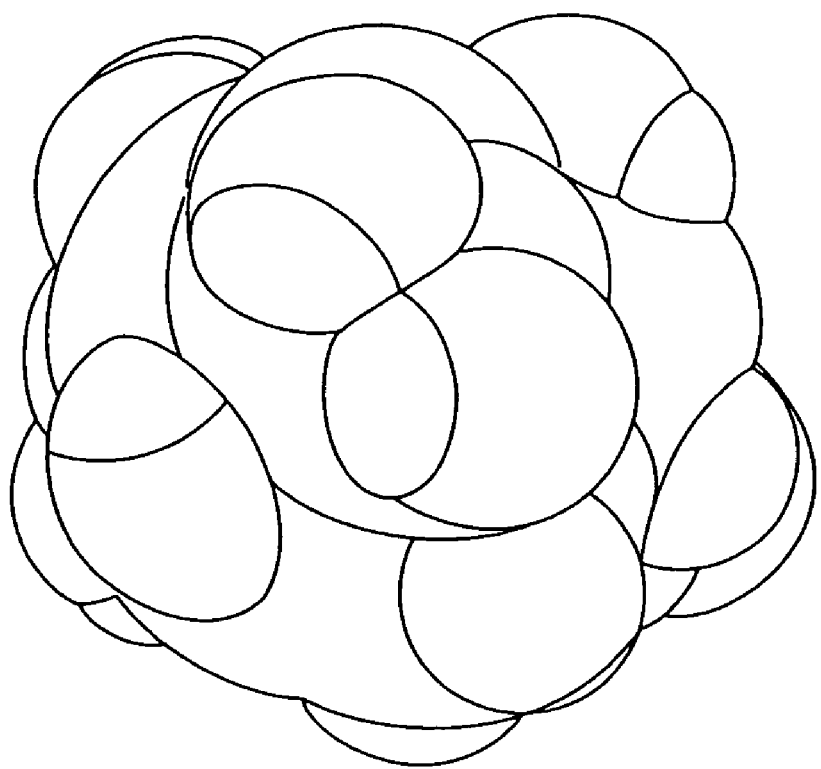
FIGS. 6A and 6B are schematic illustrations of the chemical structure of poly-fullerene hydroxide according to an embodiment of the present invention.
Figure 6A:
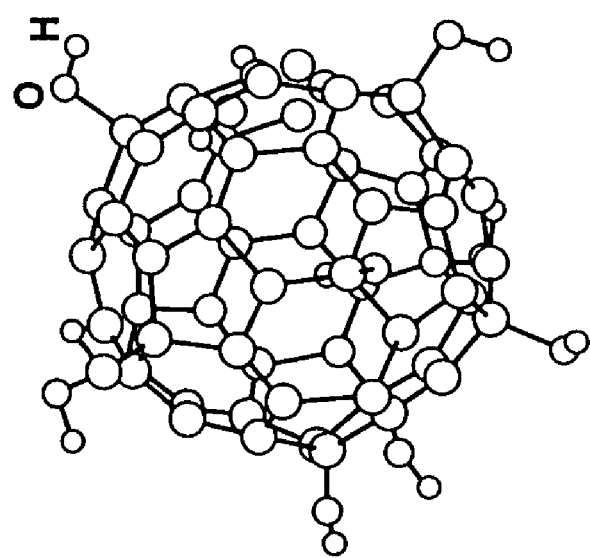

Particularly, synthesis of fullerenol having a chemical structure obtained by adding a plurality of hydroxyl groups as shown in FIGS. 6A and 6B was reported by Chiang et al. in 1992 (Chiang, L. Y.; Swirczewski, J. W.; Hsu, C. S.; Chowdhury, S. K.; Cameron, S.; Creegan, K., J. Chem. Soc., Chem. Commun., 1992, 1791).

Figure 7A:
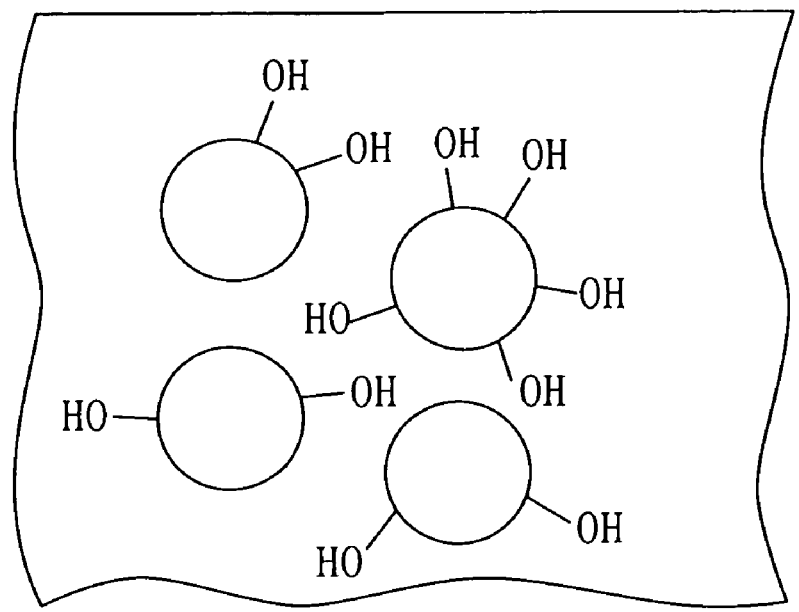
FIGS. 7A and 7B are schematic illustrations of the chemical structures of fullerene derivatives according to an embodiment of the present invention.

Hydroxyl groups of fullerenol molecules that were brought close to each other for forming agglomerates are shown in FIG. 7A (○ denotes fullerene molecule in FIG. 7A) and act on each other such that the agglomerate shows a high proton conductivity as macro-aggregate and H⁺s are easily dissociated from phenolic hydroxyl groups of fullerenol molecules. These materials can be used in the gas diffusive electrodes according to an embodiment of the present invention.

Figure 7B:
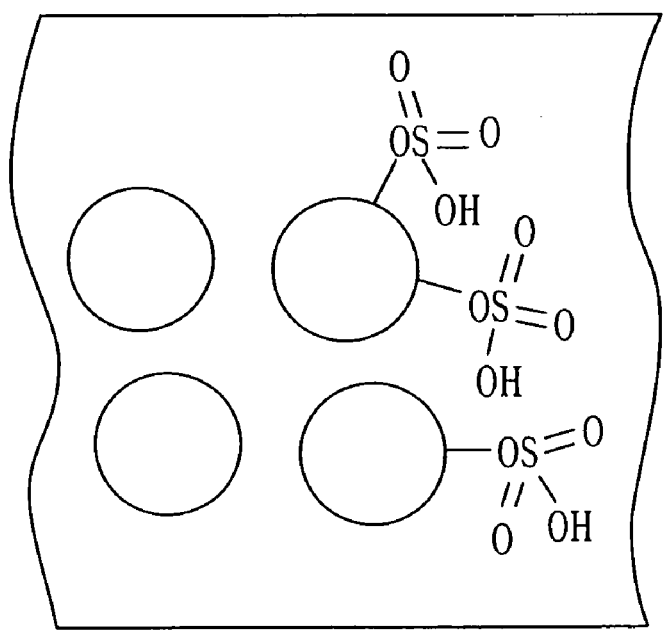

In an embodiment of the present invention, fullerene agglomerates having a plurality of —$OSO_3H$ groups may be used as ion conductor other than fullerenol. Poly-fullerene hydroxide obtained by replacing OH groups with $OSO_3H$ groups as shown in FIG. 7B was also reported by Chiang et al. in 1994 (Chiang, L. Y.; Wang, L. Y.; Swirczewski, J. W.; Soled, S.; Cameron, S., J. Org. Chem., 1994, 59, 3960). Fullerene hydrogensulfate may have only $OSO_3H$ groups or $OSO_3H$ groups and hydroxyl groups at a same time in each molecule.

When fullerenol and fullerenol hydrogensulfate are made to produce a large number of agglomerates, protons coming from a large number of hydroxyl groups and $OSO_3H$ groups of molecules of these compounds directly participate in the movement of protons so that it is not necessary to take in hydrogen and protons from the atmosphere, steam molecules and other sources to secure a desired level of proton conductivity for the bulk. In other words, it is not necessary to externally absorb moisture from outer air. Therefore, the atmosphere does not need to be subjected to restrictions. Thus, a gas diffusive electrode according to the invention can be used continuously even in a dry atmosphere.

Fullerene from which such molecules as listed above are formed shows an excellent proton conductivity because it has a high electrophilicity, which, it is believed, participate in promoting the electrolytic dissociation of hydrogen ions not only from highly acidic $OSO_3H$ groups but also from hydroxyl groups. Additionally, because a considerable number of hydroxyl groups and $OSO_3H$ groups can be introduced into each molecule, the numerical density of proton conductors that participate in proton conduction is very high to realize an effective conductivity level.

Since fullerenol and fullerenol hydrogensulfate are constituted mostly by carbon atoms of fullerene, they are lightweight and chemically hardly modified. They do not contain environment-contaminating substances. Furthermore, the fullerene producing cost is falling rapidly. Thus, it will be safe to say that fullerene is a quasi-ideal carbon material from the viewpoint of resource, environment and economy if compared with other materials.

Furthermore, it is possible to make fullerene molecules that are incorporated with any of —COOH, —$SO_3H$ and —OPO$(OH)_2$ in addition to —OH and —$OSO_3H$ and/or the like.

When synthetically producing fullerenol and other materials that can be used for the purpose of the present invention, desired groups are introduced to carbon atoms of fullerene molecules by using known processes, such as acid treatment and hydrolysis in combination.

When a fullerene derivative is used as ion conductor for the ion conducting section, it is preferable that the ion conductor is substantially made of only the fullerene derivative or bound together by means of a binding agent.

A gas diffusive electrode according to an embodiment of the present invention can suitably be used for various electrochemical devices having a first electrode, a second electrode and an ion conductor sandwiched by the two electrodes as basic structure. More specifically, a gas diffusive electrode, in an embodiment, can be used at least for the first electrode of the first and second electrodes.

A gas diffusive electrode, in an embodiment, can suitably be used for an electrochemical device having first and second electrodes, at least one of which is a gas electrode.

A fuel cell with a gas diffusive electrode according to an embodiment of the present invention will be described specifically and briefly by referring to FIG. 4.

The illustrated fuel cell includes a negative electrode 16 and a positive electrode 17 that are disposed and formed by using respective gas diffusive electrode 10 and a ion conducting section 5 sandwiched between the two electrodes. The negative electrode 16 is a fuel electrode, such as a hydrogen electrode, whereas the positive electrode 17 is an oxygen electrode, the ion conducting section 5 being realized as a proton conductor section. Terminals 15, 14 are drawn respectively from the negative electrode 16 and the positive electrode 17 and connected to a load 4 that is an external circuit.

When the fuel cell is in use, hydrogen is supplied from an inlet port (not shown) and discharged from an outlet port (not shown) at the negative electrode 16. The outlet port may be omitted.

While fuel gas ($H_2$) is driven to pass through $H_2$ flow path 12, hydrogen is diffused into the negative electrode, where protons (H⁺s) are generated. Then, the generated protons (H⁺s) move to the positive electrode 17 along with the protons generated in the ion conducting section (proton conductor section) and react with the oxygen (air) that is supplied to $O_2$ flow path 13 and directed toward its outlet port (not shown) so that consequently desired electromotive force can be taken out.

Although not referred to in the above description of the arrangement, the hydrogen supply source stores a hydrogen occluding alloy and/or a hydrogen occluding carbon material. The hydrogen occluding carbon material may be made to occlude hydrogen in advance before it is stored in the hydrogen supply source.

Now, a gas diffusive electrode and a fuel cell including an ion conductor substantially made of only a fullerene derivative according to, an embodiment of the present invention will be described by referring to FIG. 4.

The catalyst layers 10 in FIG. 4 are those of a mixture of electro-conductive carbon powder or grain and electro-conductive carbon powder or grain whose particles are provided with a water-repellent film such as a fluorine type film, to which a fullerene derivative may be added as ion conductor along with a pore forming agent, such as $CaCO_3$. A gas diffusive electrode in an embodiment is in the form of a porous gas diffusive electrode formed by using a catalyst layer 10 and a porous gas permeating collector, which may typically be a carbon sheet 11. An ion conducting section 5 that is typically formed by compression-molding a fullerene derivative or Nafion® into a film is sandwiched between the first electrode, or the oxygen electrode, and the second electrode, or the hydrogen electrode, which electrodes are realized by using a gas diffusive electrode according to the invention.

As shown in FIG. 4, the fuel cell includes a negative electrode (fuel electrode or hydrogen electrode) 16 and a positive electrode (oxygen electrode) 17 provided with respective terminals 14 and 15 and formed by using a gas diffusive electrode in an embodiment along with an ion conducting section (proton conducting film) 5 typically made of a fullerene derivative and sandwiched between the electrodes. Note, however, that the negative electrode is not necessarily a gas diffusive electrode in an embodiment. When the fuel cell is in use, hydrogen is made to flow through the $H_2$ flow path 12 of the negative electrode 16 and hydrogen ions are generated as the fuel ($H_2$) flows through the flow path 12, which hydrogen ions are then driven to move toward the positive electrode 17 along with the hydrogen ions generated in the negative electrode 16 and those generated in the ion conducting section (ion exchange film) 5. The hydrogen ions react with oxygen or air flowing through the $O_2$ flow path so that consequently desired electromotive force can be taken out.

Since the fuel cell includes a first electrode and/or a second electrode formed by using a gas diffusive electrode according to the invention, it provides an excellent catalysing effect and can secure a sufficient contact areas for the catalyst and gas ($H_2$ or the like) so that the catalyst participating in the reaction can have a large specific surface area to improve its catalysing ability and ensure a good output performance.

Additionally, hydrogen ions are dissociated in the negative electrode 16 and also in the ion conducting section 5 and move toward the positive electrode 17 so that the fuel cell shows a high ion conductivity even in a dry condition. Therefore, a fuel cell in an embodiment does not require the use of a moisturizing device so that the entire system can be simplified and lightweight. Thus, the electrodes show an improved performance particularly in terms of current density and output characteristics.

The film-shaped ion conducting body that is formed by compression-molding a fullerene derivative and sandwiched between the first and second electrodes may be replaced by an ion conducting section 5 formed by binding a fullerene derivative together by means of a binding agent. Then, the ion conducting section will show a satisfactory strength because a binding agent is used for binding the fullerene derivative together.

Polymer materials that can be used as binding agent in an embodiment include known polymers having a film forming property, of which one or more than one will be used. The polymer content of the ion conducting section in an embodiment is about 40 weight % or less because the hydrogen ion conductivity of the ion conducting section can be reduced if the polymer content exceeds 40 weight %.

Since the ion conducting section arranged in a manner as described above also contains a fullerene derivative as ion conductor, it shows a satisfactory hydrogen ion conductivity just like an ion conducting section containing only a fullerene derivative.

In this regard, the ion conducting section arranged in a manner as described above is provided with an excellent film forming property due to the polymer material added thereto unlike an ion conducting section containing only a fullerene derivative. Therefore, it can be used as a flexible ion conducting thin film that shows an enhanced strength and a good gas permeation preventing ability if compared with a compressed and molded product of powder of a fullerene derivative. The ion conducting thin film is normally made to have a film thickness of not greater than about 300 μm.

There are no particular limitations to polymer materials that can be used for the purpose of the invention so long as they do not significantly degrade the hydrogen ion conductivity of the ion conducting section (due to the reaction with the fullerene derivative) and shows a film forming ability. In an embodiment, a polymer showing no electron conductivity and having an excellent stability will be selected. Examples of such polymers include, polyfluoroethylene, polyvinylalcohol, and/or the like which are preferable polymer materials for the purpose of the invention because of the following reasons.

Polytetrafluoroethylene is preferably used, in an embodiment, because a thin film having an excellent strength can be formed with ease if it is contained only to a slight extent when compared with other polymer materials. The polytetrafluoroethylene content of the ion conducting thin film is not greater than about 3 weight %, preferably between about 0.5 and about 1.5 weight %, which is very low, so that the thin film can be made to show a small film thickness between about 1 and about 100 μm.

Polyvinylalcohol is preferably used, in an embodiment, because it can form an ion conducting thin film showing an excellent gas permeation preventing ability. The polyvinylalcohol content of the ion conducting thin film is preferably between 5 and 40 weight %, in an embodiment.

The film forming performance can be adversely affected if the content of polyfluoroethylene or polyvinylalcohol falls short of the above defined lower limit.

Various known film forming processes including compression molding and extrusion molding for forming a thin film for the ion conducting section where a fullerene derivative is bound together by means of a binding agent.

There are no specific limitations imposed on the ion conducting body sandwiched between a pair of gas diffusive electrodes in an electrochemical device according to the invention so long as it shows a good ion conductivity, a hydrogen ion conductivity in particular. Examples of materials that can be used for the purpose of the invention include fullerene hydroxide, fullerenol hydrogensulfate, Nafion® and/or the like. Additionally, a binding agent can be used as water-repellent resin for a gas diffusive electrode according to the invention.

Now, the present invention according to an embodiment will be described further by way of examples and not limitation.

EXAMPLE 1

In this example, a gas diffusive electrode was formed as a catalyst layer of a mixture containing carbon powder or grain whose particles were provided with a water-repellent film by 50 weight %. It was used as oxygen electrode. On the other hand, a fuel electrode was formed in the same manner except that it did not contain carbon powder or grain whose particles were provided with a water-repellent film. Then, a fuel cell was prepared by using the oxygen electrode and the fuel electrode and its output performance was observed while it was operated continuously.

The oxygen electrode was formed by dropping a paint prepared in a manner as described below by means of a spin coating technique which was used at a rate of 500 rpm for 5 second initially and then at a rate of 1,000 rpm for 30 seconds to form a layer and then heating and drying the paint at 120° C. The paint was prepared by dispersing carbon powder or grain whose particles were provided with a water-repellent film (particle size: 30 to 40 nm) by 0.3 g, ordinary carbon powder or grain (particle size: 30 to 40 nm) by 0.3 g and platinum micro-powder by 0.07 g in 40 g of solvent NMP (N-methylpyrrolidone). The catalyst layer had a thickness of 500 nm.

The water-repellent film formed on the particles of carbon powder or grain was between 10 nm and tens of several nm. The content ratio of the carbon powder or grain whose particles were provided with a water-repellent film and the carbon powder or grain having no water-repellent film was 1:1 by weight. The content of the catalyst (platinum or the like) in the mixture was 10 weight % of the gas diffusive electrode without a gas permeating collector (carbon sheet). Furthermore, the water-repellent film was formed on each particle of carbon powder or grain by immersing the carbon powder or grain into a TEFLON solution and subsequently drying the carbon powder or grain. The carbon powder or grain whose particles were provided with a water-repellent film of TEFLON was made to contain the water-repellent TEFLON by 30 weight % relative to the total weight of the carbon powder or grain. Then, the carbon powder or grain whose particles were provided with a water-repellent film and the carbon or grain not subjected to a water-repelling treatment were mixed with each other. The fuel electrode was prepared in the same manner except that it did not contain carbon powder or grain subjected to a water-repelling treatment.

The gas diffusive electrode prepared by following the above steps was arranged between an ion exchange film (proton conducting section) made of Nafion® (same as in the following example). Then, hydrogen gas and oxygen gas were introduced into the prepared fuel cell and the output of the fuel cell was observed. The observation was conducted under a condition where hydrogen gas and air were made to flow respectively to the fuel cell and the oxygen electrode. As output, the change with time of the voltage of the fuel cell was observed.

COMPARATIVE EXAMPLE 1

A fuel cell same as that of Example 1 was prepared except that the oxygen electrode was formed by using a catalyst layer to which carbon powder or grain whose particles were provided with a water-repellent film was not mixed and the output performance of the fuel cell was observed as in Example 1.

Figure 8:
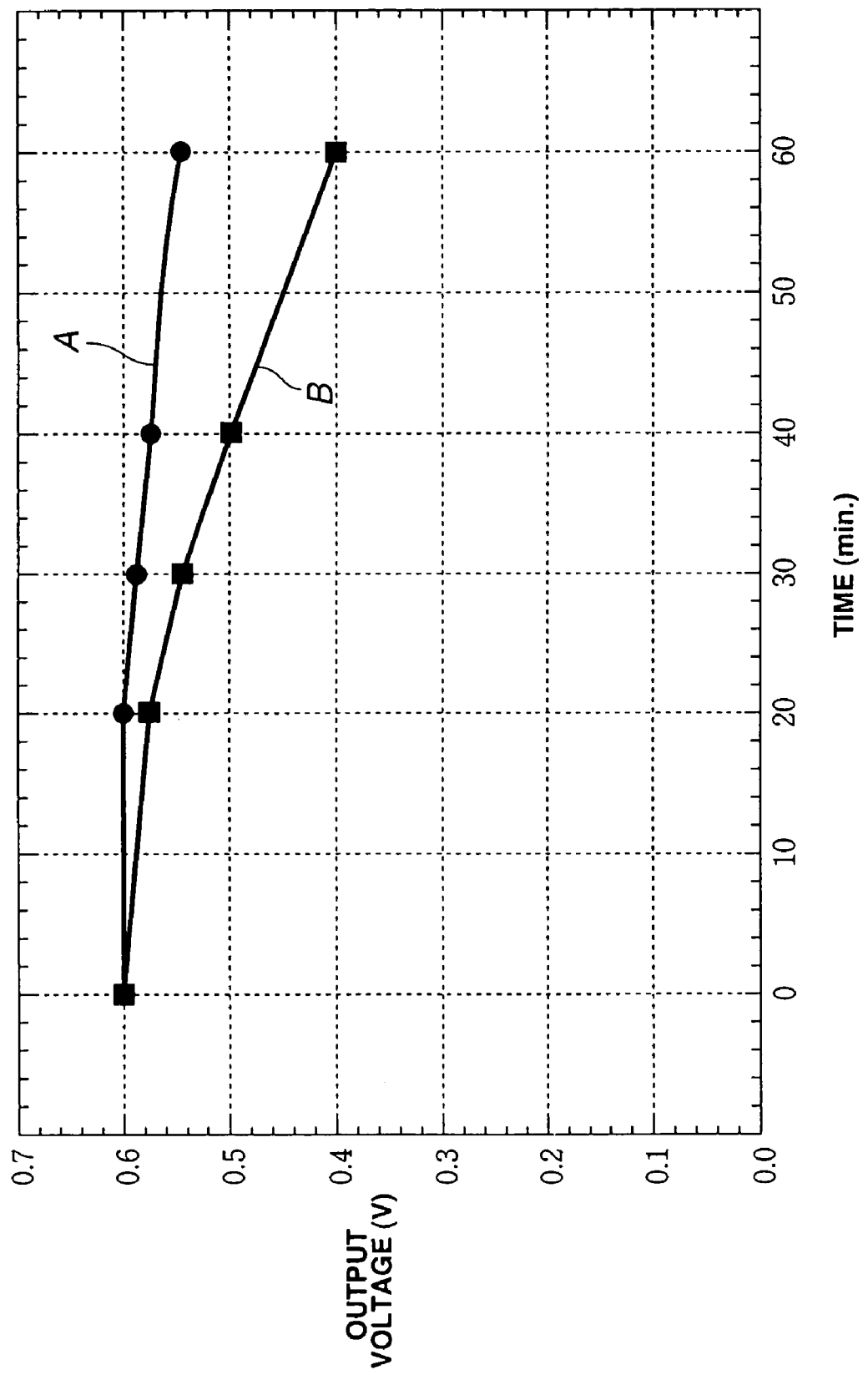
FIG. 8 is a graph illustrating the output characteristic of a fuel cell according to an embodiment of the present invention.

FIG. 8 shows the result of the observation of the output performance of the fuel cell of Example 1 and that of the fuel cell of Comparative Example 1. In FIG. 8, A denotes the output performance of the fuel cell of Example 1, whereas B denotes the output performance of the fuel cell of Comparative Example 1.

As shown in FIG. 8, the fuel cell of Example 1 showed an initial voltage of 0.6V and maintained a relatively stable output voltage, although the voltage fell to 0.55V after 60 minutes. In other words, the change with time of the output voltage was relatively small.

To the contrary, the fuel cell of Comparative Example 1 showed an initial voltage of 0.6V, which fell to 0.4V after 60 minutes. The fall in the output voltage was greater as compared with Example 1.

From the above result, it was confirmed that a fuel cell including a gas diffusive electrode formed by using carbon powder or grain whose particles were provided with a water-repellent film and ordinary carbon powder or grain maintains a high output voltage for a long period of time if compared with a fuel cell a gas diffusive electrode formed by using only ordinary carbon powder or grain.

As in Example 1, a catalyst layer was formed on an underlayer, which underlayer was formed by applying a paint prepared in a manner as described below onto a gas permeating collector (carbon sheet) by means of a doctor blade technique and then heating and drying the paint at 120° C. The paint was prepared by dispersing electro-conductive carbon powder or grain by 1.5 g and a binding agent (vinylidenepolyfluoride) by 0.4 g in 36 g of solvent NMP (N-methylpyrrolidone). The underlayer had a thickness of 10 µm. A catalyst layer was formed on the underlayer as in Example 1. A fuel cell was prepared as in Example 1 except the above to find that it showed an output performance similar to that of the fuel cell of Example 1.

While the present invention is described above by way of embodiments and examples, they can be modified appropriately without departing from the general inventive concept of the present invention.

For example, an electrochemical device in an embodiment can be applied not only to decomposition of $H_2$ but also to manufacture of $H_2$ and $H_2O_2$ by inverting the process of decomposition and/or that of synthesis.

INDUSTRIAL APPLICABILITY

As described above, since a gas diffusive electrode according to the invention is made of a catalyst and first electrical conductive powder or grain, second electro-conductive powder or grain having a water-repellent film, water generated in the gas diffusive electrode is effectively repelled by the water-repellent films of the particles of the second electro-conductive powder or grain and discharged to the outside without adhering to the electro-conductive powder or grain. Therefore, the gas permeating ability of the gas diffusive electrode can be secured satisfactorily because generated water does not obstruct permeation of gas.

Additionally, since a gas diffusive electrode in an embodiment is prepared by mixing carbon powder or grain whose particles are provided with a water-repellent film with other materials and drying the mixture so that it can be produced in a relatively simple way without require a complex producing process.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of producing a catalyst layer comprising the steps of:
    forming a mixture in a dispersion medium, the mixture including a catalyst, a first electrical conductive material and a second electro-conductive material having a water repellent coating; and
    drying the mixture.

2. The method according to claim 1, wherein the second electro-conductive material is made to agglomerate to form a chain structure.

3. The method according to claim 1, wherein the second electro-conductive material includes about 1% to about 80% by weight of the mixture.

4. The method according to claim 1, wherein the water-repellent coating includes a fluorine-based resin and at least one of the first electrical conductive material and/or the second electro-conductive material includes carbon particles.

5. The method according to claim 1, wherein the catalyst is at least one of mixed with the second electro-conductive material and coated to the second electro-conductive material.

6. The method according to claim 1, wherein at least one of the first electrical conductive material and the second electro-conductive material is in a form including a powder and/or a grain.

7. The method according to claim 1, wherein a thickness of the water repellant coating ranges from about 10 nm to about 100 nm.

8. The method according to claim 1, wherein the water repellant coating comprises a polymer selected from the group consisting of polyvinylidene fluoride (PvdF), $C_2F_6$ polymer, and polytetrafluoroethylene (PTFE).

9. The method according to claim 1, wherein the first electrical conductive material and/or the second electrical conductive material is selected from the group consisting of graphite, carbon-nanotube, needle-like graphite, and mixtures thereof.

* * * * *